US006611399B1

United States Patent
Mei et al.

(10) Patent No.: US 6,611,399 B1
(45) Date of Patent: Aug. 26, 2003

(54) MICRO-ACTUATED MICRO-SUSPENSION (MAMS) SLIDER FOR BOTH FLY HEIGHT AND TRACKING POSITION

(75) Inventors: Youping Mei, Eden Prairie, MN (US); Lanshi Zheng, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 112 days.

(21) Appl. No.: 10/006,861

(22) Filed: Dec. 4, 2001

Related U.S. Application Data

(60) Provisional application No. 60/254,071, filed on Dec. 7, 2000.

(51) Int. Cl.$^7$ ............................. G11B 5/60; G11B 5/56
(52) U.S. Cl. ............................. 360/234.7; 360/294.3; 360/294.4; 360/294.6
(58) Field of Search ...................... 360/294.3, 294.4, 360/294.5, 294.6, 234.7, 234.8, 234.9

(56) References Cited

U.S. PATENT DOCUMENTS

| | | | |
|---|---|---|---|
| 4,605,997 A | 8/1986 | Kirk ............................ 360/103 |
| 4,620,251 A | 10/1986 | Gitzendanner ............... 360/103 |
| 5,021,906 A | 6/1991 | Chang et al. ................. 360/103 |
| 5,710,683 A | 1/1998 | Sundaram ..................... 360/126 |
| 5,920,978 A | * 7/1999 | Koshikawa et al. ......... 29/603.12 |
| 5,943,189 A | * 8/1999 | Boutaghou et al. .......... 360/234.7 |
| 5,949,627 A | 9/1999 | Williams et al. ............. 360/126 |
| 5,965,840 A | 10/1999 | Nagarajan et al. ............ 136/203 |
| 5,991,113 A | 11/1999 | Meyer et al. ................... 360/75 |
| 5,995,324 A | 11/1999 | Haddock et al. .............. 360/103 |
| 6,118,637 A | 9/2000 | Wright et al. ............... 360/294.4 |
| 6,166,874 A | 12/2000 | Kim ............................... 360/75 |
| 6,246,552 B1 | 6/2001 | Soeno et al. ............... 360/294.4 |

OTHER PUBLICATIONS

Toshiki Hirano, et al., Micro–Actuator for Tera–Storage, IBM Corp., Research Division, Almaden Research Center, San Jose, CA.
U.S. patent application Ser. No. 09/733,351, Bonin, filed Dec. 8, 2000.
Bong–Hwan Kim, MEMS Fabrication of High Aspect Ration Track–Following Micro Actuator for Hard Disk Drive Using Silicon on Insulator.
PennWell Corporation, Data Storage Magazine Storage Design and Manufacture, Jul. 10, 2001, pp. 1–4, Internet.
C.E. Yeack–Scranton, An Active Slider for Practical Contact Recording, IEEE Transactions on Magentics, Vol 26, No. 5, Sep. 1990, pp. 2478–2483.
Gang Sheng et al., Design and Analysis of MEMS–based Slider Suspension for a High–Performance Magnetic Recording System, 2000 IOP Publishing Ltd., pp. 64–71.

* cited by examiner

Primary Examiner—Robert S. Tupper
(74) Attorney, Agent, or Firm—Kinney & Lange P.A.

(57) ABSTRACT

A microfabricated slider assembly used in a disc drive is disclosed. The slider assembly has a slider body having a stator and a rotor, wherein the rotor and the stator are integrally formed from a single substrate. The rotor has a head supporting portion movable both laterally and vertically in relation to the stator to facilitate positioning the transducer head accordingly. The slider assembly also has a microactuator for actively moving the rotor. In one embodiment, the slider assembly has microactuators for actively moving the rotor both laterally and vertically.

21 Claims, 7 Drawing Sheets

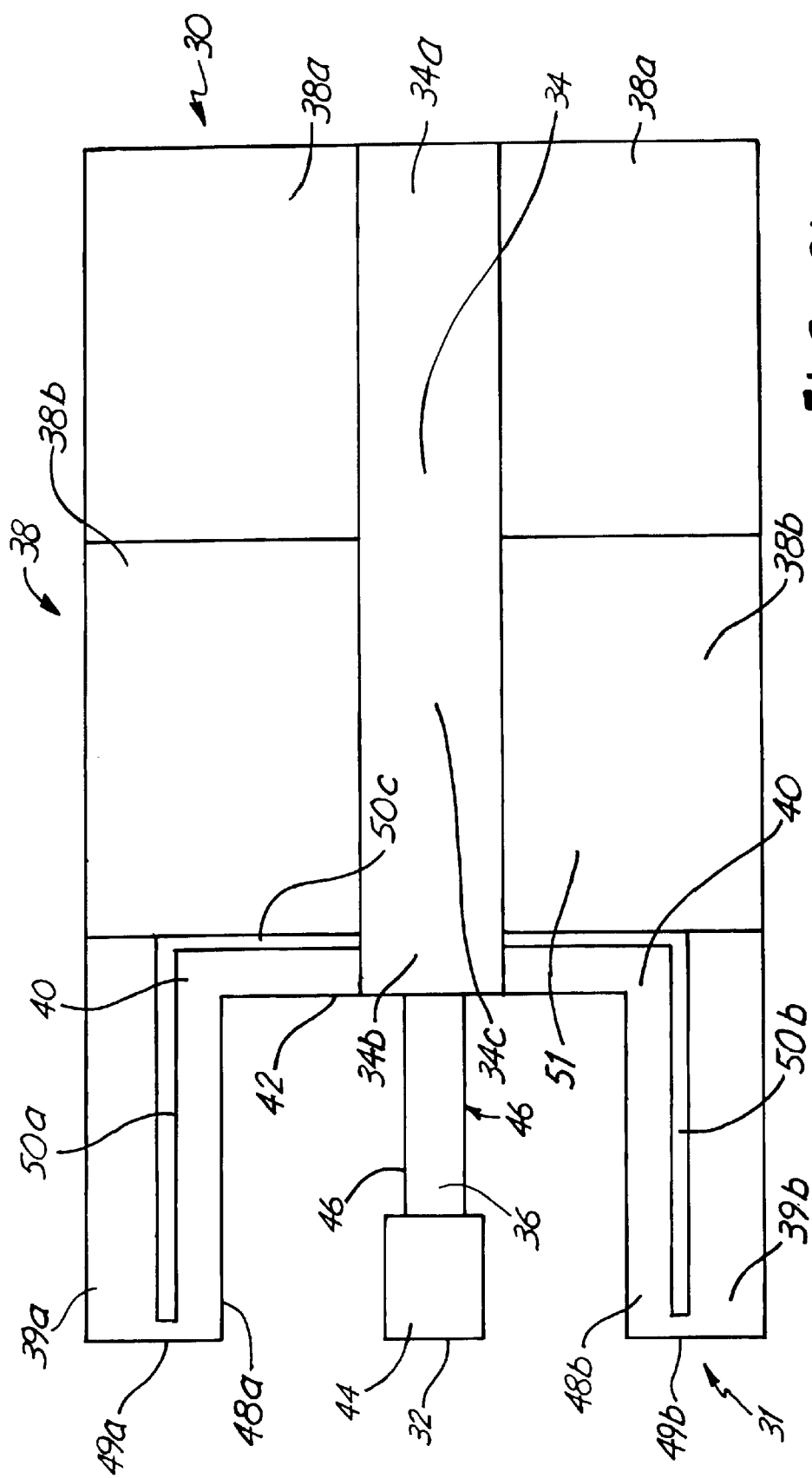

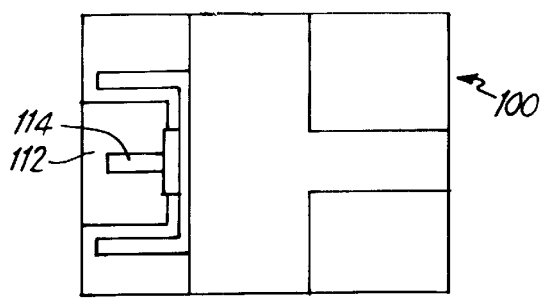
FIG. 9a
FIG. 9b
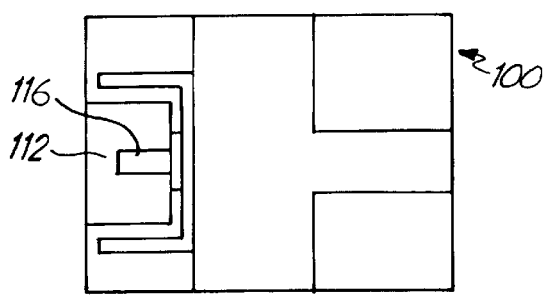
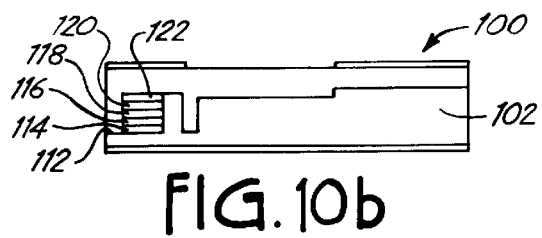
FIG. 10a
FIG. 10b
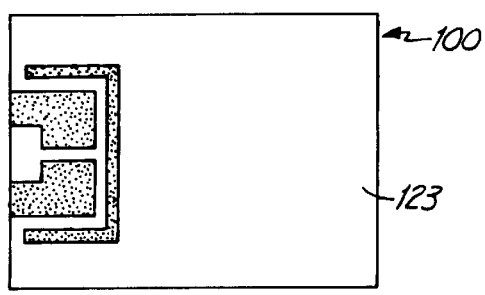
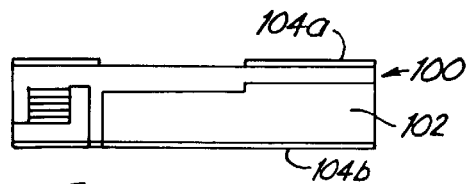
FIG. 11a
FIG. 11b
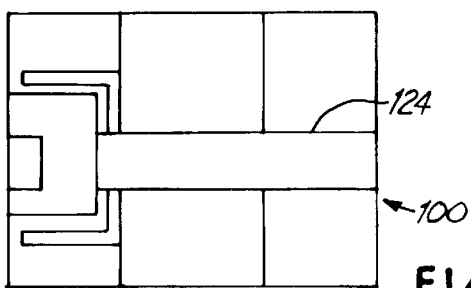
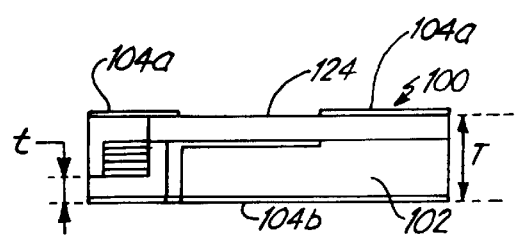
FIG. 12a
FIG. 12b

MICRO-ACTUATED MICRO-SUSPENSION (MAMS) SLIDER FOR BOTH FLY HEIGHT AND TRACKING POSITION

CROSS-REFERENCE TO RELATED APPLICATION(S)

This application claims priority from Provisional Application No. 60/254,071, filed Dec. 7, 2000 for "Micro-Actuated Micro-Suspension (MAMS) Slider Design for Both Fly Height and Tracking Position" by Youping Mei and Lanshi Zheng. The aforementioned Provisional Application No. 60/254,071 is hereby incorporated by reference.

BACKGROUND OF THE INVENTION

The present invention relates to a disc drive microactuator, and more particularly to a high resolution positioning mechanism implemented at the slider level for selectively moving a transducer portion of the slider radially (laterally) and vertically with respect to circumferential data tracks of a rotatable disc.

As the areal density of concentric data tracks on magnetic discs continues to increase (that is, the size of data tracks and radial spacing between data tracks are decreasing), more precise head positioning is required. Head positioning in a hard disc drive includes two distinct but related aspects: tracking control (i.e., radial positioning of the head) and fly-height control (i.e., head-media spacing). As discussed herein, both aspects are important considerations for the hard disc drives in the future.

Conventionally, tracking control (radial head positioning) is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising approach for high resolution head positioning involves employing a high resolution microactuator in addition to the conventional lower resolution actuator motor, thereby effecting head positioning through dual-stage actuation. Various microactuator designs have been considered to accomplish high resolution head positioning. Some designs are employed to deform disc drive components such as the actuator arm or the flexure in order to achieve minute displacements by bending. Other designs introduce a separate microactuator component at an interface between disc drive components. U.S. Pat. No. 6,118,637 to Wright et al., for example, discloses an assembly including a gimbal, a piezoelectric element bonded to the gimbal and electrically connected to a voltage source, and a slider connected to the piezoelectric element. In the Wright patent, the microactuator (the piezoelectric element) is a separate unit that operates to change to position of the entire slider.

While many previous microactuator designs are able to deliver satisfactory micropositioning performance, their effectiveness is inherently limited by the sheer mass that the microactuators are designed to move. In order to move or bend one or more of the disc drive components, the microactuator employed must provide a relatively large amount of force, which requires either a complex or relatively massive microactuator motor mechanism.

More recent developments include building a microactuator at the slider level, that is, to have a microactuating means built in the slider to positionally adjust a part of the slider instead of the entire slider. For example, a microactuator for moving a transducer-carrying portion of the slider is disclosed in U.S. application Ser. No. 09/733,351, filed Apr. 5, 2000, entitled "Slider-Level Microactuator for Precise Head Positioning". The slider according to that patent application includes a main body carried by a flexure. A stator extends from the main body, and a plurality of beams extend from the stator, the beams being flexible in a lateral direction. A rotor is connected to the stator by the plurality of beams, forming a gap between the stator and the rotor. The rotor carries the transducing head. A plurality of stator electrodes are formed on the stator, and a plurality of rotor electrodes are formed on the rotor to confront the stator electrodes across the gap. The resultant electrostatic microactuator is able to laterally move the rotor within the slider. The above identified U.S. application is hereby incorporated herein by reference.

Compared to the tracking control, fly-height control is a separate but related problem. In addition to having direct impact on radial positioning resolution, a higher areal density of data tracks also requires that the fly-height be decreased in order to afford higher signal resolution. That is, it is desirable for the air-bearing surface of a slider to fly as close to the media as possible, without touching the media to produce better resolution of data on the media, because read/write signal strength is dependent on the distance between the magnetic imaging gap in the read/write head, and close spacing improves transducer performance without having to improve sensitivity of the transducer.

As the fly-height of the head decreases, fluctuation, vibration, roughness of the disc surface and thermal effects start to play an increasingly important role, creating a more stringent requirement for fly-height stability which can be effectively addressed only using an active fly height control mechanism.

In addition to the random fluctuation caused by mechanical noises, it is known that the air flow, which causes the slider to float, increases as the head is moved from the inner to the outer circumference of the disc. An adjustment device is thus required in order to keep the height at which the head slider is floating constant as the radial positioning the head slider above the disc surface changes.

Furthermore, because a typical head in a hard disc drive is actually utilized only in a small percentage of the time when the hard disc drive is operating, there is a need for active fly-height control to reduce wearing on the head and the disc by avoiding or reducing the head-disc contact during turning of the disc. As a related issue, most present slider assemblies use a positive loading mounting system which is configured to rest the slider upon the magnetic media disc when the disc is not turning, allowing the slider to "fly above" the disc after it begins to turn. With positive loading, a slider is biased toward the disc; its air-bearing surface rides above the disc only after the viscous air currents are developed by rotation of the disc. A potential problem of positive loading is that the heads and slider may stick to the disc when it has stopped due to formation of a "vacuum" weld between the opposed precision flat surfaces of the slider and disc. It is therefore desirable to have active control over the vertical position of the slider to avoid or help to break a vacuum weld.

Various methods exist in the prior art for controlling transducer head fly-height. For example, it is known to address the head-media spacing loss due to thermal expansion of the transducer by optimizing the thermal mechanical structure and properties of the transducer. Such a method is in essence a passive countermeasure and fails to actively adjust the pole tip position of the transducer to consistently minimize its impact on head-media spacing.

Several patents discuss the use of piezoelectric material in a slider, to adjust the position of a transducer mounted to the slider. For example, U.S. Pat. No. 5,021,906 (Chang et al.) discloses a programmable air bearing slider with a deformable central region between leading edge and trailing edge regions. The deformable region is controlled electrically to change the angle between the leading and trailing regions, thus to change the position of a transducer mounted to the trailing region. The deformable central region is made of an electrically deformable material (such as a piezoelectric material) while the leading region and the trailing region are made of conventional ceramic materials for making sliders. The patent makes no disclosure as to how the slider and the deformable central region are made and assembled.

U.S. Pat. No. 5,991,113 (Meyers et al.) discloses a transducer flexible toward and away from the air bearing surface responsive to changes in the slider operating temperature. Transducer movement is either due to a difference in thermal expansion coefficients between a transducing region of the slider incorporating the transducer and the remainder of the slider body, or by virtue of a strip of thermally expansive material incorporated into the slider near the transducer to contribute to the displacement by its own expansion. To achieve such transducer movement, special materials of different thermal expansion characteristics are used to make the area carrying the transducer and the rest of the slider. In addition, a heating device and a temperature control circuit are required.

U.S. Pat. No. 4,605,977 (Matthews) discloses a flexible beam affixed to the slider providing a cantilever structure. A magnetic head is mounted on the free end of the cantilever. A pair of oppositely polarized piezoelectric crystals are mounted on the cantilever assembly. When energized by an electrical driving source, the cantilever beam is flexed upwards or downwards thereby changing the distance of the magnetic head from the disc. The beam in the above patent, however, is separately machined from a material and then attached to the slider.

The problems which exist in the prior art schemes for fly-height control include difficulties in fabrication, large activation voltages required for deforming materials a sufficient amount to control the transducer position, lack of fast response bandwidth required in disc operation, lack of simplicity of implementation, and most of all, lack of an integrated slider level microactuating scheme to provide active head positioning having both tracking control and fly-height control.

BRIEF SUMMARY OF THE INVENTION

The present invention provides a microfabricated slider assembly in a disc drive for supporting a transducer head with respect to a rotatable disc. The slider assembly comprises a slider body having a stator and a rotor, wherein the rotor and the stator are integrally formed from a single substrate, the rotor has a head supporting portion carrying the transducer head, and the head supporting portion of the rotor is movable in both vertical and lateral directions in relation to the stator. The movement of the head supporting portion of the rotor in the lateral direction is actively controlled by a microactuator. The movement of the head supporting portion of the rotor in the vertical direction may be passive only, but can optionally be actively controlled by the same or a second microactuator.

In one embodiment of the inventive slider assembly, the rotor has a head supporting portion and a base portion. The base portion of the rotor is movable along with the head supporting portion of the rotor in relation to the stator, and the head supporting portion of the rotor is further movable in relation to the base portion of the rotor. As a combined effect, the head supporting portion of the rotor is capable of moving in both lateral and vertical directions in relation to the stator.

BRIEF DESCRIPTION OF THE DRAWINGS

FIG. 3b is a schematic top view of a slider employing slider-level microactuation in accordance with the present invention.

FIGS. 4a–10a, and 12a are top views of the silicon substrate for the slider of the present invention illustrating steps of manufacture.

FIG. 11a is a bottom view of the silicon substrate for the slider of the present invention illustrating steps of manufacture.

FIGS. 4b–12b are through the center cross-section views of a silicon substrate for a slider of the present invention illustrating steps of manufacture.

DETAILED DESCRIPTION

1. Embodiments

Figure 1:
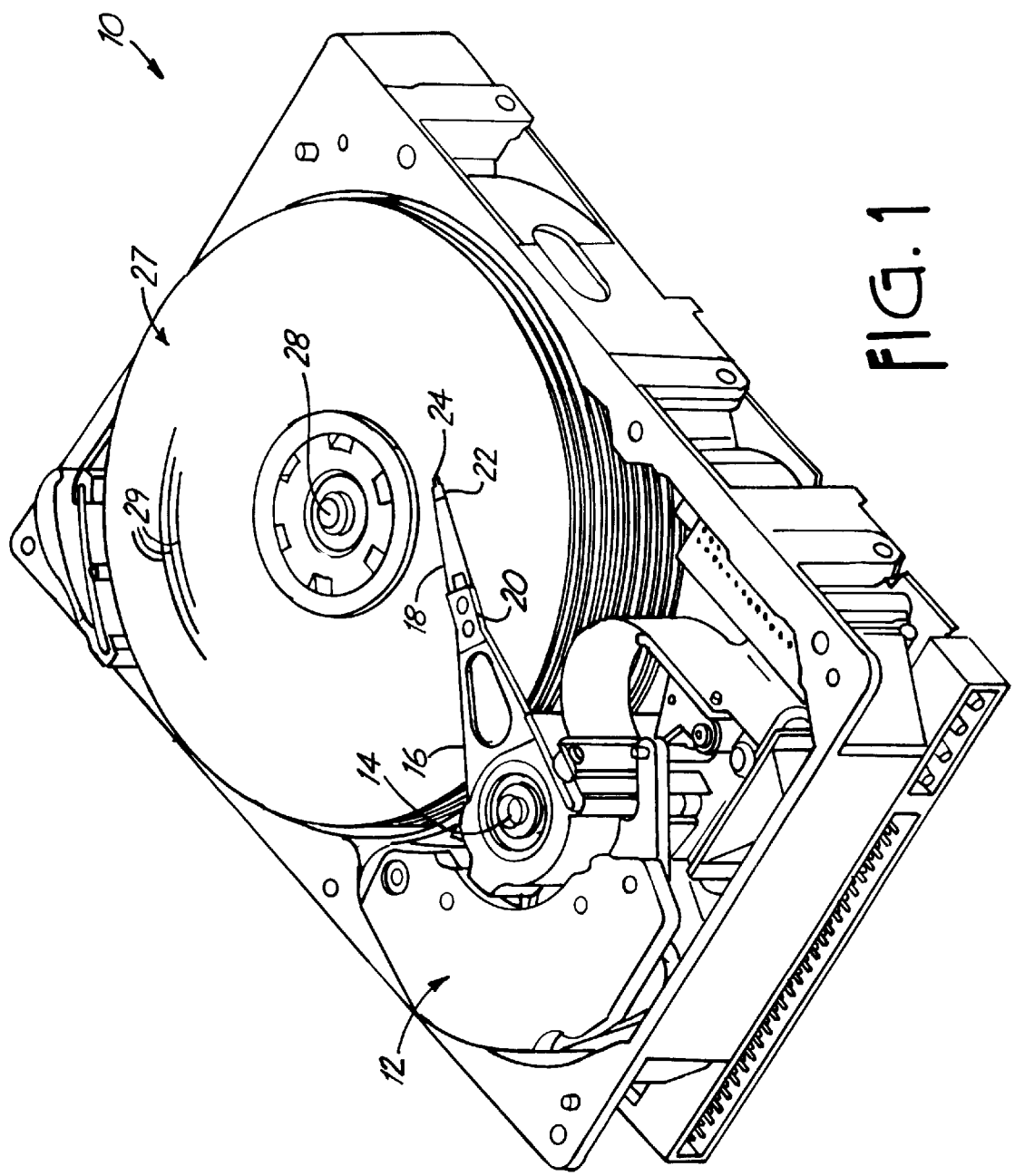
FIG. 1 is a perspective view of a prior art disc drive.

FIG. 1 is a perspective view of a prior art disc drive 10. Actuation system 10 includes voice coil motor (VCM) 12 arranged to rotate actuator arm 16 on a spindle around axis 14. Head suspension 18 is connected to actuator arm 16 at head mounting block 20. Flexure 22 is connected to an end of head suspension 18, and carries slider 24. Slider 24 carries a transducing head (not shown in FIG. 1) for reading and/or writing data on disc 27, which rotates around axis 28 and includes concentric tracks 29 on which the data is written. As disc 27 rotates, windage is encountered by slider 24 to keep it aloft a small distance above the surface of disc 27 based on an air bearing mechanism.

VCM 12 is selectively operated to move actuator arm 16 around axis 14, thereby moving slider 24 between tracks 29 of disc 27. However, for disc drives with high track density, VCM 12 lacks sufficient resolution and frequency response to position a transducing head on slider 24 precisely over a selected track of disc 27. Therefore, a higher resolution actuation device is necessary. In addition, VCM 12 lacks active control of the distance between the transducing head and the surface of disc 27 (i.e., fly-height). Additional microactuating means is necessary to give such control.

Figure 2:
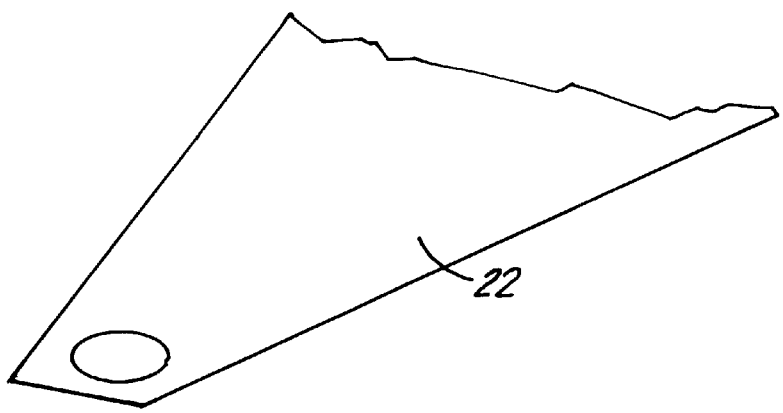
FIG. 2 is an exploded perspective view of a portion of a disc drive having a slider in accordance with the present invention.
Figure 2:
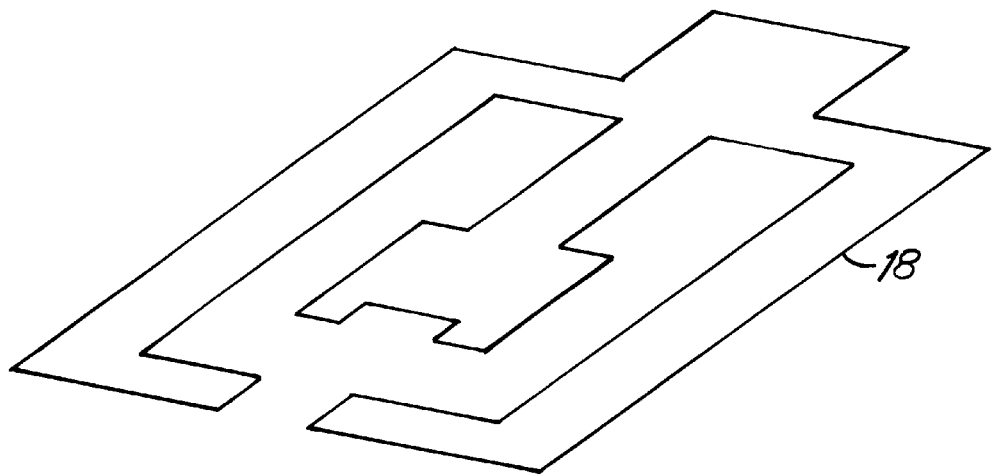
Figure 2:
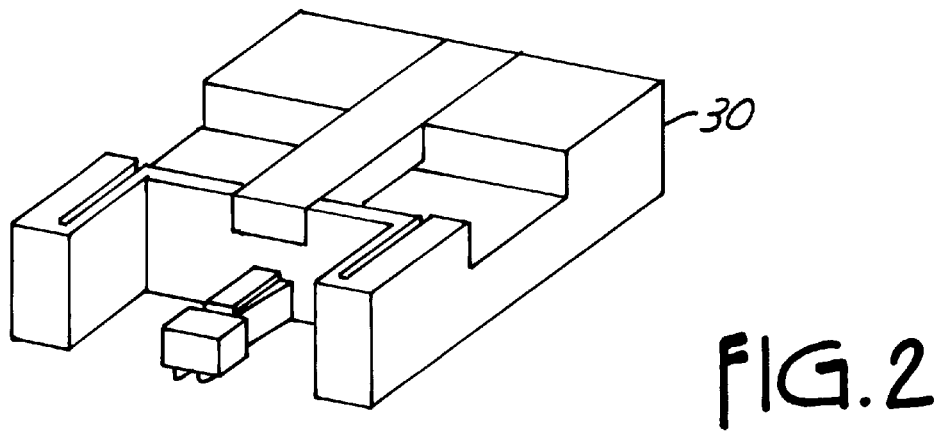

FIG. 2 is an exploded perspective view of a portion of a disc drive having a slider assembly 30 in accordance with the present invention, showing flexure 22 attached to suspension 18 and supporting slider assembly 30 above a surface of a disc (not shown). In operation of the disc drive, suspension 18, flexure 22 and slider assembly 30 are all moved together as coarse positioning is performed by a voice coil motor (VCM) (not shown) arranged to rotate a conventional actuator arm and thus suspension 18 connected thereto.

As described in detail herein, slider assembly 30 in accordance with the present invention has a slider level rotor/stator structure and additional microactuator means for high-resolution head positioning.

Figure 3A:
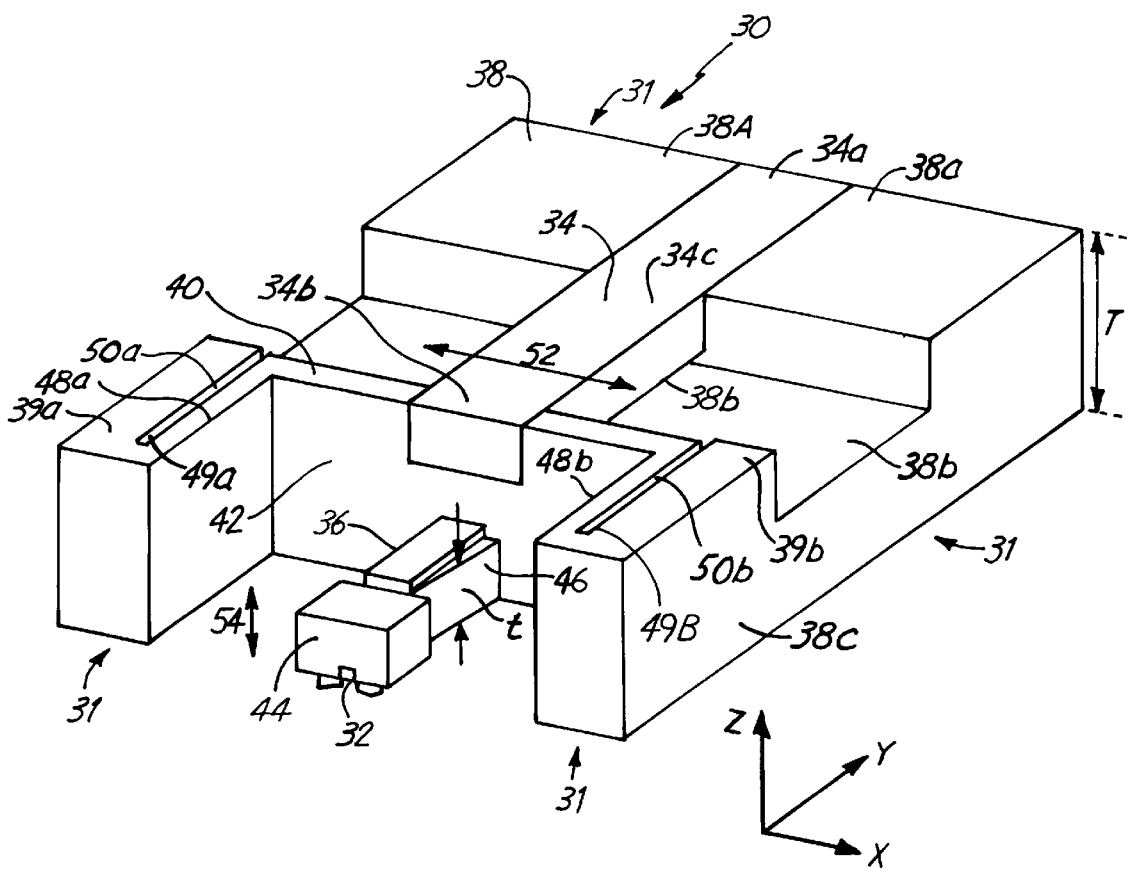
FIG. 3a is a perspective view of a slider employing slider-level microactuation in accordance with the present invention.
Figure 3C:
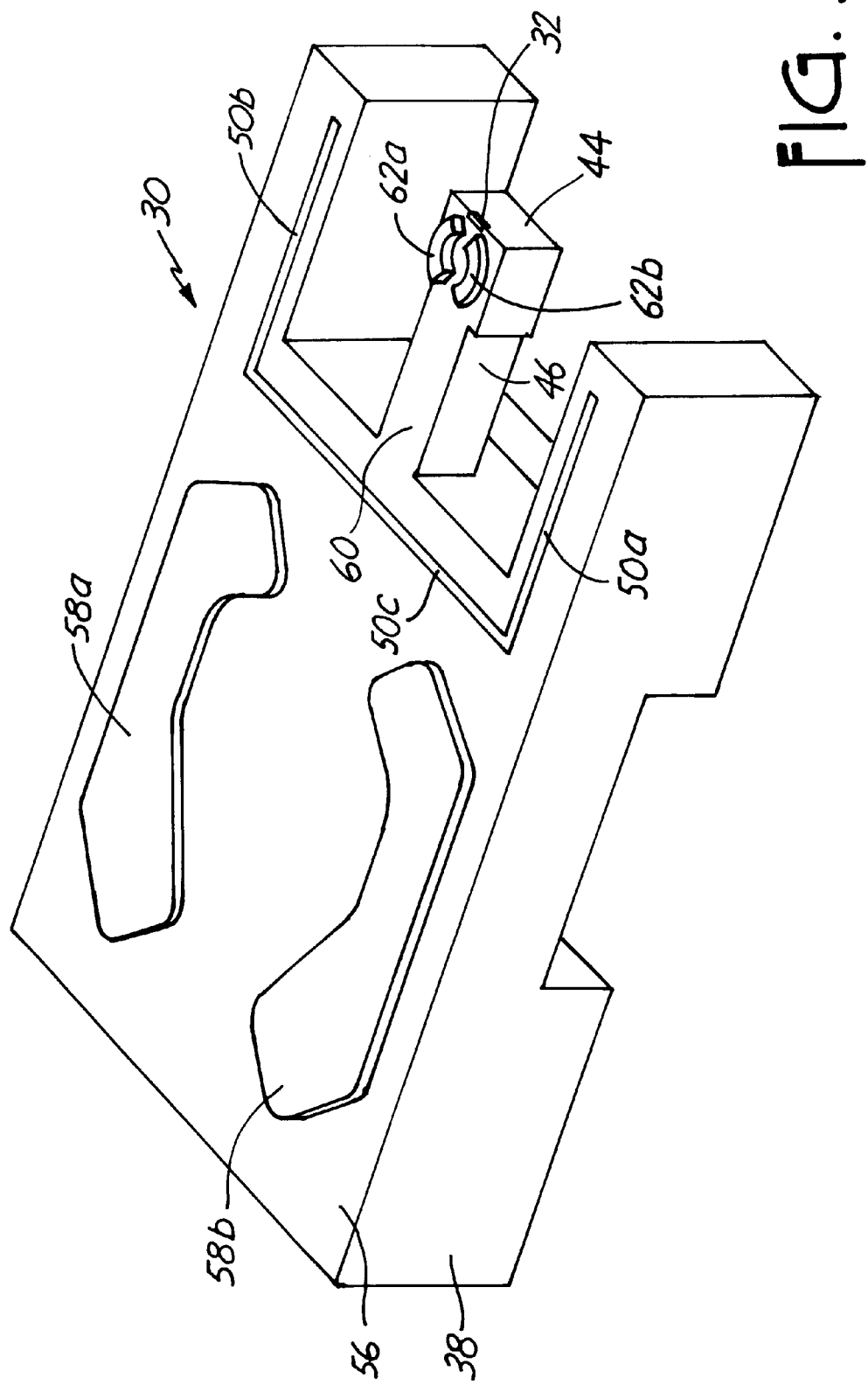
FIG. 3c is a bottom perspective view of a slider employing slider-level microactuation in accordance with the present invention.

FIGS. 3a–3c show an exemplary slider assembly 30 according to the present invention.

FIG. 3a is a perspective view of an upper side of slider assembly 30. Slider assembly 30 extends a width in a x-axis, a length in an y-axis, and a thickness in a z-axis. Slider assembly 30 includes main slider body 31, transducer head 32, first microactuator 34, and second microactuator 36. Main slider body 31 includes two major portions: a stator 38 and a rotor 40, which are integrally formed from a single substrate. Stator 38 includes an end portion 38a, a central portion 38b and arms 39a and 39b connecting to rotor 40. Rotor 40 includes a base portion 42, a head supporting portion 44 (which carries the transducer head 32), a neck portion 46 (which connects head supporting portion 44 of rotor 40 to base portion 42 thereof), and connecting arms (or beams) 48a and 48b (which connect rotor 40 to stator 38 via arms 39a and 39b thereof).

Stator 38 and rotor 40 are connected via arms 39a and 39b and beams 48a and 48b at pivoting points 49a and 49b, but are otherwise generally separated from each other to allow movement of rotor 40 in relation to stator 38. The separation between stator 38 and the rotor 40 is partially illustrated by gaps 50a and 50b in FIG. 3a.

Head supporting portion 44 of rotor 40 is movable in both vertical and lateral directions in relation to the stator 38. The lateral direction is illustrated by an arrow 52, which lies along the x-axis in an x-y plane parallel the disc surface (not shown). Correspondingly, the vertical direction is defined by the z-axis perpendicular to the x-y plane, as illustrated by an arrow 54.

In this disclosure, the word "movable" means either being able to move by passively adjusting to the environment (such as that in the air bearing mechanism) or being flexible by an active adjustable force (such as that in a microactuating mechanism).

First microactuator 34 is connected at opposite ends 34a and 34b to stator 38 and rotor 40 to bridge these two major portions of slider body 31. Microactuator 34 is used for actively moving rotor 40 and thus head supporting portion 44 in the lateral direction in relation to stator 38. As shown in FIG. 3a, microactuator 34 is beam-shaped and has two ends 34a and 34b and a middle portion 34c, with end 34a affixed on stator 38 at its rear end 38a, end 34b affixed on rotor 40 at its base portion 42, and middle portion 34c laterally bendable. For better mobility of microactuator 34, middle portion 34c of microactuator 34 is separated (and preferably spaced by a small distance) at its bottom side (not shown) from an opposing portion 38b of stator 38.

As microactuator 34 bends laterally, its end 34a moves laterally and thus moves base portion 42 of rotor 40 accordingly. As base portion 42 of rotor 40 moves laterally, head supporting portion 44 of shorter 40 and transducer head 32 carried thereon move accordingly. Microactuator 34 thus provides microactuation to laterally (i.e., radially) adjust the tracking position of transducer head 32 in relation to the disc (not shown).

Second microactuator 36 is placed on neck portion 46 of rotor 40. Neck portion 46 extends from base portion 42 of rotor 40 to form of cantilever which is vertically bendable by second microactuator 36. As neck portion 46 bends vertically, transducer head 32 carried thereon moves vertically (i.e., up and down) accordingly. Microactuator 36 thus provides microactuation to vertically adjust the distance between transducer head 32 and the disc surface.

FIG. 3b is a schematic top view of slider assembly 30 showing the same structure illustrated in FIG. 3a. Gap 50c, which is not shown in FIG. 3a, further illustrates the separation between stator 38 and rotor 40. Gap 50c generally extends along the width of the slider assembly 30.

FIG. 3c illustrates a bottom of slider assembly 30. The bottom of the slider assembly 30 faces the disc surface (not shown). Stator 38 carries on its bottom 56 air bearing surfaces 58a and 58b, which extend slightly beyond the rest of bottom 56. Bendable cantilever 46 carries on its bottom 60 secondary air bearing surfaces 62a and 62b facing the disc. Main air bearing surfaces 58a and 58b provide coarse passive adjustment of fly-height of transducer head 32. Secondary air bearing surfaces 62a and 62b provide further passive adjustment of fly-height of transducer head 32 through vertical movability of head supporting portion 44 facilitated by the flexibility of cantilever 46.

The present invention therefore discloses a novel slider assembly that has a slider level rotor/stator structure used for fine positioning the transducer head in both lateral and vertical directions. Slider assembly 30 offers a capability of precise dynamic adjustments of radial track pitch position and fly-height of the transducer head. Due to the very small mass of the rotor portion, the microactuation has very fast response bandwidth. In addition, the structure also requires a very small actuation voltage.

The particular configuration of slider assembly 30 as shown in FIGS. 3a–3c is for purpose of illustration only. Variations may be used within the spirit of the invention. Examples of such variations are discussed as follows.

Significantly, although head supporting portion 44 of rotor 40 is movable both laterally and vertically, it is not required, however, to be actively moved in both lateral and vertical directions by actuation means. The vertical movability of head supporting portion 44 particularly, can be utilized for functional benefits through passive adjustments to the environment without active actuation. For example, slider assembly 30 may include first microactuator 34 (FIGS. 3a–3b) to laterally move head supporting portion 44 but not second microactuator 36 (FIGS. 3a–3b) to vertically move head supporting portion 44. In this configuration, the vertical mobility of head supporting portion 44 may still be used for an advantage through a passive adjustment mechanism such as air bearing through secondary air bearing surfaces 62a and 62b (FIG. 3c).

Mirroring the above configuration, slider assembly 30 may alternately have second microactuator 36 (in addition to first microactuator 34) to provide active vertical actuation but not secondary air bearing surfaces 62a and 62b to provide additional passive vertical adjustment.

When included, secondary air bearing 62a and 62b can be either positive loading mode or negative pressure mode, similar to the primary air bearing 58a and 58b known in the art of air bearing sliders.

Furthermore, active control of fly-height through vertically moving head supporting portion 44, if desired, does not have to be accomplished using the particular microactuating scheme as shown in FIGS. 3a and 3b. For example, first microactuator 34 may be designed to actuate rotor 40 as a whole both laterally and vertically, thus making second microactuator 36 optional even when head supporting portion 44 is activated both laterally and vertically. Alternatively, although both first and second microactuators (34 and 36) may be used, second microactuator 36 can be placed at a similar location to that of first microactuator 34 (i.e., bridging stator 38 and shorter 40 rather than sitting on a side of cantilever 46) to actuate rotor 40 as a whole vertically. With the above alternatives, rotor 40 may have a simple structure without distinctive features of a base portion 42 and extending cantilever 48 because both lateral and vertical actuation of transducer head are facilitated by moving the rotor as a whole.

In the above configurations, rotor 40 may be pivotable in relation to stator 38 at pivoting points (such as 49a and 49b) both vertically and laterally to facilitate the lateral and vertical movements of head supporting portion 44 respectively. Alternatively, rotor 40 and stator 38 may be connected through a plurality of beams (such as a variation of 48a and 48b) which are bendable both vertically and laterally to facilitate the lateral and the vertical movement of head supporting portion 44 respectively.

However, due to considerations of mechanical soundness of the structure, it may be desirable to avoid an aspect ratio of beams 48a and 48b that allows bending in both lateral and vertical directions. It is therefore preferred that the head supporting portion be vertically flexible without substantially bending beams 48a and 48b. This can generally be accomplished by having a head supporting portion extending from a base portion of rotor 40 and separated from the beams 48a and 48b. The bendable cantilever 46 shown in FIGS. 3a–3c is a particular example of a structure of this type. As described, bendable cantilever 48 can be used either actively or passively to adjust the vertical position of transducer head 32. In addition, the cantilever structure as shown in FIGS. 3a–3c has other advantages such as even higher bandwidth of response frequency due to further reduced mass of the vertically movable part in rotor 40.

Alternatively, slider assembly 30 may have microactuator 36 only if the microactuator is capable of actuating head supporting portion 44 both laterally and vertically without assistance of another microactuator (e.g, microactuator 34). For example, microactuator 36 may be adapted to be able to bend cantilever (neck portion) 46 both laterally and vertically. With this configuration, only separations between cantilever 46 and stator 38 are necessary, and there is no need for rotor 40 to have a base portion 42 that is separated from stator 38 via slots 50a, 50b and 50c.

Cantilever 46, when used, may be further designed to function as a micro-suspension arm having a gram load applied thereon to create a static deflection toward the disc surface in addition to the general deflection of the entire slider assembly 30 caused by the gram load applied on suspension load beam 18 (FIG. 1). Additionally or alternatively, this can be accomplished using the secondary air bearing surfaces 62a and 62b. For example, the secondary air bearing surfaces 62a and 62b on the bottom 60 of the cantilever 46 may extend slightly further beyond the main air bearing surfaces 54a and 54b to let cantilever 48 have a natural static deflection downward to the disc surface, such that in a static condition where no other external forces exist, transducer head 32 rests on the disc surface.

In the particular structure shown in FIGS. 3a–3c, stator 38 includes two side arms 39a and 39b extending along the length (y-axis) of slider assembly 30 to pivoting points 49a and 49b respectively. The connecting beams 48a and 48b fold back from pivoting points 49a and 49b along the opposite length direction of slider assembly 30 and thus place rotor 40 within an aperture space between two extended side arms 39a and 39b. Such an arrangement is preferred because it results in a compact slider assembly 30. Other arrangements of stator 38 and rotor 40, however, are also possible as long as the arrangement allows head supporting portion 44 of rotor 40 to be movable both laterally and vertically.

Although piezoelectric microactuators are preferred, various other Ac types of microactuators known in the art may be used as first microactuator 34 and second microactuator 36.

For example, the static electrode microactuation used in U.S. application Ser. No. 09/733,351, filed Apr. 5, 2000, entitled "Slider-Level Microactuator for Precise Head Positioning" can be used for first microactuator 34 for lateral actuation. The slider according to that patent application includes a stator extending from a main body, a rotor connected to the stator by a plurality of beams, forming a gap between the stator and the rotor. To form a static electrode microactuator, a plurality of stator electrodes are formed on the stator, and a plurality of rotor electrodes are formed on the rotor to confront the stator electrodes across the gap. A similar electrostatic microactuator may be used in the present invention as a substitute for microactuator 34. For example, static electrodes may be placed across gap 50c between stator 38 and rotor 40 to facilitate lateral actuation of rotor 40.

Preferably, however, microactuators 34 is a piezoelectric microactuator. For higher output efficiency (represented by signal voltage/bending displacement ratio), microactuator 34 is still more preferably a bimorph piezoelectric microactuator such as an in-plane bimorph piezoelectric microactuator which bends laterally when an electric field is provided in the vertical direction (i.e., over the thickness of piezoelectric material layers in the microactuator).

As to second microactuator 36, it is also possible to build a microactuator such as an electrostatic microactuator on the transducer head 32 to directly move the transducer head 32 without distorting proportion of rotor 40 such as cantilever 48. From the manufacturing point of view, however, microactuator 36 is a piezoelectric microactuator placed on a bendable portion of rotor 40 (such as on a side of cantilever 48). As described in the next section of this disclosure, such a piezoelectric microactuator can be formed using thin film deposition method in the same process of forming slider body 31.

2. Method of Fabrication a. Selecting and Fabricating a Suitable Microactuator

The factors to be considered in selecting a suitable microactuator is well-known in the art. Piezoelectric microactuators have both advantages and disadvantages when compared with electromagnetic and electrostatic actuators. Advantages include high force output, low current requirement resulting in low stray magnetic fields, simple implementation resulting in fewer processing steps (e.g., fewer steps than fabrication of micromachined electrostatic or electromagnetic actuators), and the ability to remain motionless without the application of a voltage or current. Disadvantages include displacement hysteresis which may require using specialized circuitry (e.g., charge-feedback control circuitry) to compensate for the error in displacement caused by the hysteresis.

The most common material used for piezoelectric actuators is lead zirconate titanate, PZT (Pb$\{Zr_xTi_{1-x}\}O_3$, where x is approximately equal to 0.54), formed between the solid solution of lead zirconate, PZ (PbZrO$_3$), and lead titanate, PT (PbTiO$_3$). A number of designated types of PZT are available commercially, each having a specified set of properties, achieved through varying the Zr/Ti ratio and by adding dopants (such as Nb, Mn, Sr or La). Although alternatives to PZT exist, such as a solid solution between lead magnesium niobate, PMN (PbMg$_{1/3}$Nb$_{2/3}$O$_3$) and PT (e.g. 0.1PT–0.9PMN), which produce a larger strain, such alternatives typically are more expensive or have other disadvantages.

Furthermore, the selection of the material and the fabrication of a microactuator used in the present invention should be made in connection with the preferred methods of making a slider assembly as described herein.

Microactuators 34 and 36 can be either formed directly on the slider assembly 30 at proper locations using MEMS techniques such as thin film deposition methods or formed separately and placed on the slider assembly 30. Due to the difference in their sizes and locations, it is preferred that microactuator 34 is formed separately and subsequently placed on slider assembly 30 while microactuator 36 is formed directly on the slider.

Various methods are known in the art to make microactuators. One technique for processing a bimorph actuator utilizes two pieces of bulk PZT, many times larger than the desired final dimension (thickness would be desired thickness), connected together with a conductive epoxy. The center electrode may be patterned, which may be carried out with screen printing, and a two-wire connection made to an actuator. Once attached, the outer electrodes are deposited by an appropriate method (sputtering, evaporation, plating, etc.). Standard photolithographic techniques are then used to pattern the outer electrodes.

Once fabricated, the microactuator may be placed in the slider assembly 30 and bonded to the slider at a proper location using an adhesion means such as epoxy.

b. Making of the Slider Assembly

Slider assembly 30 is preferably made integrally using micro-electro-mechanical-system (MEMS) techniques. Prior to the MEMS-based slider process, a silicon wafer is first provided. In a typical process, an array of transducers are mounted at their proper locations on the wafer. The wafer is then cut into silicon bars each having multiple slider dies. Individual silicon bars are provided for etching. Although it is possible to carry out the etching processing at wafer level or at individual slider level, it is preferred to process at silicon bar level for the convenience of handling during manufacturing. The silicon bar has a top surface and a bottom surface. The main portions (corresponding to stator 38 and rotor 40 in FIGS. 3a–3c) are silicon mechanical structures etched based on a silicon substrate as described herein. Various suitable etching methods, particularly high resolution etching processes known in the art, such as ion milling, reactive ion etching (RIE), deep trench reactive ion etching (DRIE) or wet etching may be used to form the main portions of the slider 30.

An exemplary etching process used for making a slider assembly 30 is described as follows with reference to FIGS. 4a–12b. The figures are presented in two separate groups with the "a" group (FIGS. 4a–12a) arranged on the left side illustrating either top or bottom views of the substrate, and the "b" group (FIGS. 4b–12b) arranged on the right side illustrating through the center cross-sectional views of the substrate.

Although the etching process is illustrated herein using a single slider 100, the actual process is accomplished on multiple sliders simultaneously on the entire silicon bar.

Figure 4A:
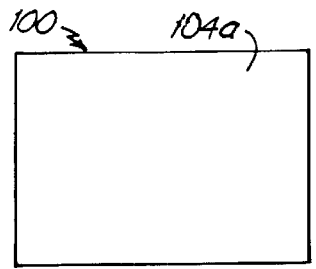
Figure 4B:
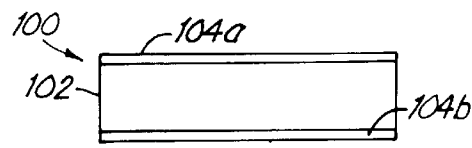

As shown in FIGS. 4a and 4b, oxide layers 104a and 104b for masking purposes are deposited on the entire top surface and the bottom surface of the silicon substrate 102 for slider 100. Alternatively, a top (or bottom) layer of silicon substrate 102 can be oxidized to form thermal masking oxide layer 104a or 104b on a surface of the silicon substrate 102.

Figure 5A:
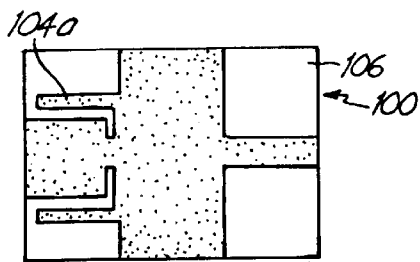

In FIG. 5a, a silicon structure resist mask 106 is placed on the oxide layer 104a to facilitate etching into the oxide layer 104a in the region illustrated by the shaded areas in FIG. 5a. Resist 106 is subsequently stripped away.

Figure 5B:
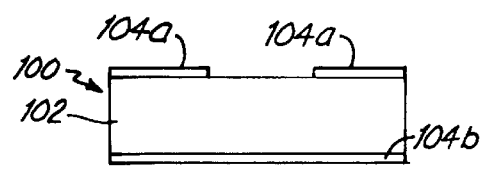

FIG. 5b shows a through-the-center cross-sectional view of the substrate after the above-described etching step and subsequent stripping away resist 106 to expose the unetched oxide layer 104a. The remaining part of oxide layer 104a in FIG. 5b (corresponding to the unshaded areas in FIG. 5a before resist 106 is stripped away) thus forms a hard mask for further processing.

Figure 6A:
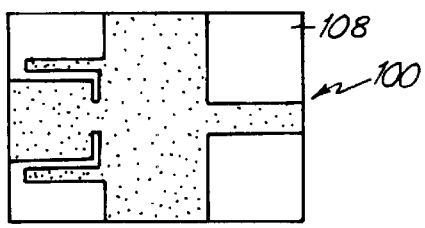
Figure 6B:
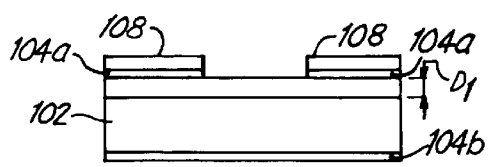

In FIGS. 6a and 6b, a second resist mask 108 of the same shape of the mask 106 (FIG. 5a) is then formed on top of the oxide hard mask 104a. The uncovered region (illustrated by the shaded region in FIG. 7a) is then etched to a first depth $D_1$ (FIG. 6b) which is to be the thickness of a first microactuator (e.g., microactuator 34 in the slider assembly 30 shown in FIGS. 3a–3c). Resist 108 is then stripped.

Figure 7A:
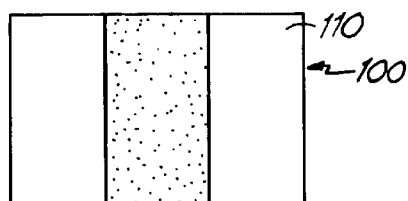
Figure 7B:
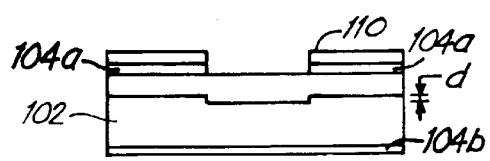

In FIGS. 7a and 7b, another photo resist patterning (using resist mask 110) and etching step is performed according to FIG. 7a such that a small depth d (FIG. 8b) is etched in the shaded region in FIG. 7a. This small depth is to facilitate free movement of the first microactuator in relation to the slider body 100. Resist 110 is then stripped.

Figure 8A:
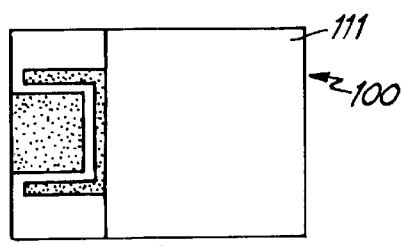
Figure 8B:
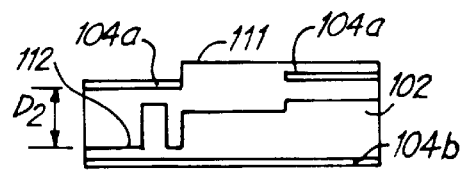

In FIGS. 8a and 8b, the slider is masked again using resist 111 according to FIG. 8a to facilitate deep trench reactive ion etching (DTRIE) in the shaded region in FIG. 8a. This etching step reaches a second depth $D_2$ at a surface 112 that is to be the top surface bearing a second microactuator (e.g., top surface of cantilever 48 or micro suspension 48 bearing microactuator 36 in FIGS. 3a–3c). Resist 111 is then stripped.

In FIGS. 9a and 9b, a contacting layer 114 is deposited surface 112 and patterned to a desired shape (shown in FIG. 10a) such that it will be the bottom contacting layer on top of cantilever 48.

FIGS. 10a–10b illustrated the second microactuator is formed. In FIG. 10a, a first PZT layer 116 is then deposited on top of the contacting layer 114 and patterned to form the first PZT layer of the second microactuator (e.g., microactuator 36 on top of cantilever 48 in FIGS. 3a–3c). As shown in FIG. 10b, a middle contacting layer 118, a second PZT layer 120 and a top contacting layer 122 are subsequently and similarly formed on top of each other to form the second microactuator (e.g., microactuator 36 in FIGS. 3a–3c).

In FIG. 11a, the oxide mask 104b (FIG. 5b) on the bottom surface of the slider 100 is then photo masked by resist 123 to facilitate deep trench reactive ion etching (DTRIE) in the shaded region in FIG. 11a. The above etched region positionally partially coincides with the etched region in the etching step illustrated in FIG. 8a such that the slider structure is etched through the shaded region illustrated in FIGS. 11a. After etching, resist 123 is stripped away. FIG. 11b shows a through the center cross-sectional view with resist 123 stripped.

In FIGS. 12a and 12b, a separately prepared PZT microactuator 124 is placed on the slider to form the first microactuator (e.g., microactuator 34 in FIGS. 3a–3c).

The slider assembly thus formed corresponds to slider assembly 30 illustrated in FIGS. 3a–3c. FIG. 12b shows a general thickness T of the slider assembly and a smaller thickness t which corresponds to the thickness of cantilever 48 in FIG. 3a.

The detailed integral micro-electro-mechanical-system (MEMS) technique and etching process as described herein is for the purpose of illustration only. Variations are possible.

3. Summary

The present invention therefore discloses a novel slider assembly that has a slider level rotor/stator structure integrally formed from the same substrate, wherein the rotor facilitates fine positioning the transducer head in both lateral and vertical directions. At least one direction, preferably both directions, can be actively positioned using microactuating means at the slider level. Due to the small mass of the flexible parts in the microactuating mechanism, very high frequency response bandwidth can be achieved. Additionally, the slider assembly in accordance with the present invention can be made using efficient micro-electro-mechanical-system (MEMS) fabricating methods. The inventive slider assembly also provides an option of an integrated design for both active fly-height control and lateral positioning control. In addition, the slider assembly may have a dual air bearing system to reduce the fly height modulation and to increase the stability of the system.

Although the present invention has been described with reference to preferred embodiments, workers skilled in the art will recognize that changes may be made in form and detail without departing from the spirit and scope of the invention.

What is claimed is:

1. A slider assembly used in a disc drive for supporting a transducer head with respect to a rotatable disc, the slider assembly comprising:
   a slider body having a stator and a rotor, wherein the rotor and the stator are integrally formed from a single substrate, the rotor has a head supporting portion carrying the transducer head, and the head supporting portion of the rotor is movable in both vertical and lateral directions in relation to the stator; and
   microactuating means for laterally moving the head supporting portion of the rotor in relation to the stator.

2. The slider assembly of claim 1, wherein the microactuating means includes a microactuator for vertically moving the head supporting portion of the rotor in relation to the stator.

3. The slider assembly of claim 1, wherein the rotor has a base portion, and wherein the head supporting portion of the rotor is movable in vertical direction in relation to the base portion of the rotor.

4. A slider assembly used in a disc drive for supporting a transducer head with respect to a rotatable disc, the slider assembly comprising:
   a slider body having a stator and a rotor, wherein the rotor and the stator are integrally formed from a single substrate, the rotor has a head supporting portion carrying the transducer head, and the head supporting portion of the rotor is movable in both vertical and lateral directions in relation to the stator; and
   a first microactuator for laterally moving the head supporting portion of the rotor in relation to the stator.

5. The slider assembly of claim 4, wherein the first microactuator is placed on the slider body.

6. The slider assembly of claim 4, further comprising a second microactuator for vertically moving the head supporting portion of the rotor in relation to the stator.

7. The slider assembly of claim 4, wherein the rotor has a base portion, and wherein the head supporting portion of the rotor is movable in vertical direction in relation to the base portion of the rotor.

8. The slider assembly of claim 4, wherein the head supporting portion of the rotor is a micro suspension beam having an air bearing surface.

9. The slider assembly of claim 8, further comprising:
   a second microactuator placed on the micro suspension beam for bending thereof in the vertical direction.

10. The slider assembly of claim 4, wherein the stator has a first air bearing surface and the rotor has a second air bearing surface.

11. The slider assembly of claim 4, wherein the substrate is a silicon wafer and the stator and the rotor are formed based on the silicon substrate using an etching method.

12. The slider assembly of claim 4, wherein the rotor has a base portion from which the head supporting portion of the rotor extends along a length of the slider body, the base portion being connected to the stator by a plurality of beams, the beams being bendable to facilitate lateral motion of the rotor in relation to the stator, and wherein the first microactuator laterally bends the plurality of beams.

13. The slider assembly of claim 12, wherein the base portion of the rotor is separated from the stator by a gap extending along a width of the slider body, and the first microactuator is a piezoelectric microactuator placed across the gap, the first microactuator having a proximal end fixed on the stator and a distal end fixed on the base portion of the rotor.

14. A slider assembly used in a disc drive for supporting a transducer head with respect to a track of a rotatable disc, the slider assembly comprising:
   a slider body having a stator and a rotor, wherein the rotor and the stator are integrally formed from a single substrate, and the rotor has a head supporting portion carrying the transducer head thereon and a base portion connected to the head supporting portion, the rotor being movable in a first direction in relation to the stator and the head supporting portion of the rotor being movable in a second direction in relation to the base portion of the rotor; and
   a first microactuator for moving the rotor.

15. The slider assembly of claim 14, wherein the first direction is the lateral direction and the second direction is the vertical direction.

16. The slider assembly of claim 14, wherein the first microactuator is for laterally moving the rotor and positioning the transducer head accordingly.

17. The slider assembly of claim 14, wherein the first microactuator is for vertically moving the rotor and positioning the transducer head accordingly.

18. The slider assembly of claim 14, further comprising:
   a second microactuator for moving the rotor.

19. The slider assembly of claim 14, wherein the rotor is connected to the stator by a plurality of beams, the beams being bendable to facilitate lateral movement of the base of the rotor in relation to the stator, and the head supporting portion extends from the base portion along a length of the slider body and is separated from the plurality of beams.

20. The slider assembly of claim 14, wherein the head supporting portion of the rotor is a micro suspension beam having an air bearing surface.

21. The slider assembly of claim 14, wherein the slider body has a first thickness and the head supporting portion of the rotor has a second thickness which is smaller than the first thickness.

* * * * *

UNITED STATES PATENT AND TRADEMARK OFFICE
CERTIFICATE OF CORRECTION

PATENT NO.     : 6,611,399 B1
DATED          : August 26, 2003
INVENTOR(S)    : Youping Mei et al.

It is certified that error appears in the above-identified patent and that said Letters Patent is hereby corrected as shown below:

<u>Column 12,</u>
Line 10, after "other" delete "Ac".

Signed and Sealed this

Twentieth Day of January, 2004

JON W. DUDAS
*Acting Director of the United States Patent and Trademark Office*